United States Patent

Reckziegel et al.

(10) Patent No.: US 10,661,743 B2
(45) Date of Patent: May 26, 2020

(54) METHOD FOR ASCERTAINING A TRIGGERING EVENT FOR AN AIRBAG

(71) Applicant: Robert Bosch GmbH, Stuttgart (DE)

(72) Inventors: Bastian Reckziegel, Kirchheim/Nabern (DE); Erich Sonntag, Marbach am Neckar (DE); Gunther Lang, Stuttgart (DE); Parisa Ebrahim, Stuttgart (DE); Simon Koenig, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 195 days.

(21) Appl. No.: 15/872,273

(22) Filed: Jan. 16, 2018

(65) Prior Publication Data

US 2018/0201214 A1 Jul. 19, 2018

(30) Foreign Application Priority Data

Jan. 19, 2017 (DE) .................. 10 2017 200 788

(51) Int. Cl.
*B60R 21/0134* (2006.01)
*B60R 21/0132* (2006.01)
*B60R 21/01* (2006.01)

(52) U.S. Cl.
CPC ...... *B60R 21/0134* (2013.01); *B60R 21/0132* (2013.01); *B60R 2021/01013* (2013.01); *B60R 2021/01286* (2013.01); *B60Y 2400/304* (2013.01); *B60Y 2400/3015* (2013.01); *B60Y 2400/3017* (2013.01)

(58) Field of Classification Search
CPC ............ B60R 21/0134; B60R 21/0132; B60R 2021/01013; B60R 2021/01286; B60R 21/0136; B60R 21/01504; B60Y 2400/3015; B60Y 2400/3017; B60Y 2400/304; A61G 2203/72
See application file for complete search history.

(56) References Cited

U.S. PATENT DOCUMENTS

| 2010/0063676 A1* | 3/2010 | Ito ................... B60R 21/0134 701/36 |
| 2013/0125651 A1* | 5/2013 | Morningstar ........... G01P 21/00 73/514.16 |
| 2014/0200773 A1* | 7/2014 | Wellhoefer ......... B60R 21/0134 701/45 |

* cited by examiner

*Primary Examiner* — Anne Marie Antonucci
*Assistant Examiner* — Abdalla A Khaled
(74) *Attorney, Agent, or Firm* — Norton Rose Fulbright US LLP; Gerard Messina

(57) ABSTRACT

In a method for ascertaining a triggering event for an airbag in a vehicle, an imminent collision is ascertained with the aid of a surroundings sensor, an error signal being generated if no signal is established in a collision sensor within a defined time window.

9 Claims, 2 Drawing Sheets

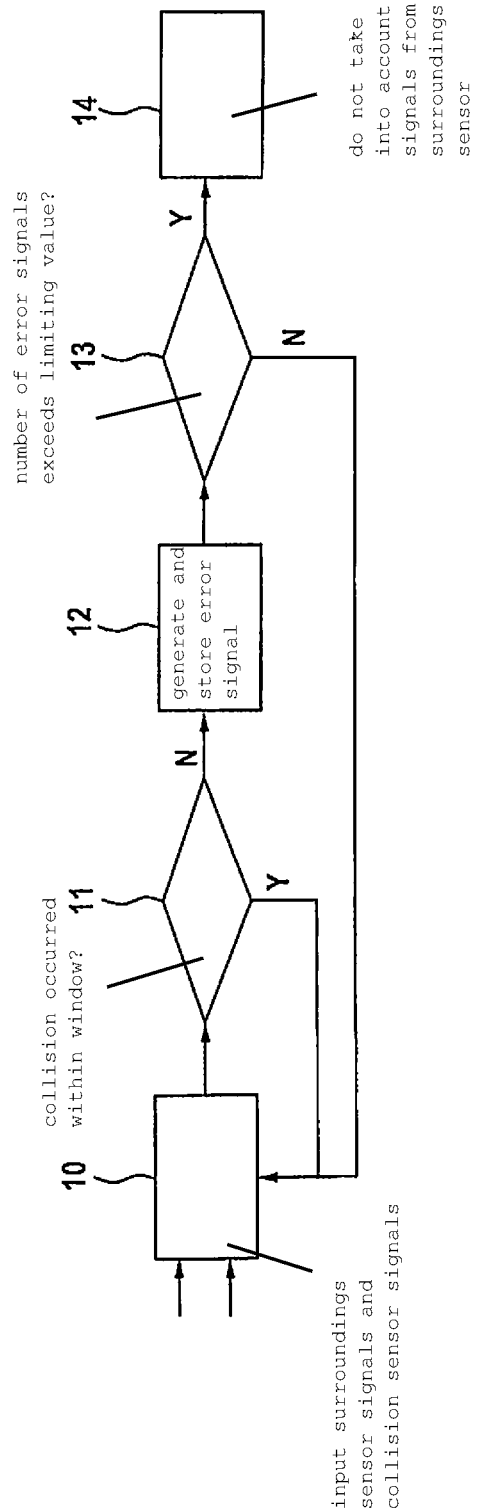

METHOD FOR ASCERTAINING A TRIGGERING EVENT FOR AN AIRBAG

CROSS REFERENCE

The present application claims the benefit under 35 U.S.C. § 119 of German Patent Application No. DE 102017200788.5 filed on Jan. 19, 2017, which is expressly incorporated herein by reference in its entirety.

FIELD

The present invention relates to a method for ascertaining a triggering event for an airbag in a vehicle.

BACKGROUND INFORMATION

Conventional airbags in the vehicle are often integrated into the steering wheel of the vehicle and are triggered if a rapid deceleration in the vehicle is established by sensors. In order for the airbag to be triggered, the vehicle deceleration must exceed a defined threshold value which is typical for a collision of the vehicle with an object. The sensor is an acceleration sensor, whose sensor signals are evaluated in a control unit in which actuating signals are optionally generated for the triggering of the airbag. The propagation and processing times for the sensor signals and actuating signals are to be taken into consideration during the triggering of the airbag.

SUMMARY

An example method according to the present invention relates to the ascertainment of a triggering event for an airbag in a vehicle. In the example method, sensor information from two different sensors in the vehicle is evaluated, one of which is a collision sensor for determining a collision of the vehicle and the other of which is a surroundings sensor for monitoring the vehicle surroundings, in particular the area ahead of the vehicle, with respect to an imminent collision. The surroundings sensor is capable of establishing an imminent collision even before the actual onset of the collision. The surroundings sensor therefore delivers a suitable signal chronologically before the collision sensor.

If an imminent collision is correctly established in the surroundings sensor, preparatory measures for the triggering of the airbag may be carried out, whereby the period of time between the onset of the collision and the triggering of the airbag or of the firing mechanism of the airbag is shortened. One precondition is that a signal indicating a collision is established both in the surroundings sensor and in the collision sensor.

With respect to the surroundings sensor in particular, there is the risk, however, that an imminent collision is erroneously established. This may be based, for example, on a misinterpretation of the received signals, in particular due to adverse surroundings conditions such as, for example, reflections on wet roadways or on tunnel walls or the like. Such false signals are non-critical insofar as a positive signal is generated in the collision sensor in the case of an actual collision, which results in the triggering of the airbag. If a collision does not take place, however, a suitable signal is not established in the collision sensor, either, and therefore the triggering of the airbag does not take place.

In order to ensure that the surroundings sensor functions correctly and generates a suitable signal in the case of an actually imminent collision, the time window between a signal from the surroundings sensor and a collision signal from the collision sensor is ascertained and compared to a defined time window. If the actual period of time between the surroundings sensor signal and the collision sensor signal exceeds the defined time window, an error signal is generated, which indicates a malfunction of the surroundings sensor. The functionality of the airbag system, in particular of the collision sensor, is not adversely affected thereby.

This has the advantage that a malfunction of the surroundings sensor may be established, whereupon further measures may be taken, for example, the error signal may be stored for documentation purposes, or the error signal may be displayed. According to one advantageous embodiment, the signals from the surroundings sensor for the triggering of the airbag in the vehicle will not be taken into consideration after an error signal has been generated.

According to yet another advantageous embodiment, the non-consideration of the signals from the surroundings sensor takes place only after a defined number of error signals. It may be advantageous, for example, to set an error signal number limit of, for example, three, four, or five error signals, further signals from the surroundings sensor not being taken into consideration with respect to the triggering of the airbag once this number of error signals has been reached and the airbag being triggered only on the basis of the collision sensor signal. Due to the fact that an error signal number limit is predefined, the method is set to be error-tolerant with respect to individual error events. Once the error signal number limit has been reached or exceeded, suitable signals from the surroundings sensor will not be taken into consideration for ascertaining a triggering event.

It may be advantageous if the error signal is valid only for a present operation of the vehicle and, after a restart of the vehicle, the surroundings sensor is utilized again for collision monitoring. If one error or multiple errors occurs/occur in the surroundings sensor again after the restart of the vehicle, error signals are generated again and the surroundings sensor will possibly not be taken into consideration for the triggering of the airbag.

Moreover, it is also possible to utilize the surroundings sensor again for collision monitoring after a defined time interval has elapsed. The non-consideration of the surroundings sensor after a defined number of error signals has been reached therefore takes place only for a certain time interval, after the elapse of which—and in the absence of a restart of the vehicle—the surroundings sensor is taken into consideration again for the ascertainment of the triggering event for the airbag. By way of this measure, for example, a change in the surroundings conditions may be taken into account, for example the vehicle emerging from a tunnel or the road drying off, whereupon the surroundings sensor generates more reliable signals again.

According to yet another advantageous embodiment, the time window between the surroundings sensor signal and the collision sensor signal is changeably set as a function of one or multiple driving condition variables and/or surroundings variables. For example, the time window may be calculated as a function of the vehicle speed and/or the relative speed between the vehicle and the collision object. The dependence may be linear or non-linear. Moreover, it is possible to establish the time window dependent on parameters of the surroundings sensor, for example the resolution accuracy or the detection area.

In one alternative embodiment, the time window between the surroundings sensor signal and the collision sensor signal is set as a fixed, unchanging variable.

According to yet another advantageous embodiment, the collision sensor is an acceleration sensor in the vehicle, with the aid of which vehicle accelerations or decelerations may be ascertained. If the vehicle deceleration is above a defined limiting value, a collision of the vehicle with a collision object must be assumed, whereupon the airbag is triggered in any case.

Additionally or alternatively, the deformation of a body portion of the vehicle located, in particular, in the vehicle front area may be ascertained as the collision sensor. If the deformation exceeds a defined limiting value, a collision with a collision object must likewise be assumed, the severity of which justifies the triggering of the airbag.

The surroundings sensor, with the aid of which, in particular, the surroundings ahead of the vehicle are detected, is, for example, a camera or a radar system. In the case of a camera, an image of the surroundings is recorded, which is evaluated in a regulating and control unit and checked for the presence of a collision object. In the case of a radar system as a surroundings sensor, reflected radar beams, which are transmitted by the radar system, are detected and investigated for the presence of a collision object.

The different method steps take place in a regulating and control unit which also controls, in particular, the triggering of the airbag in the vehicle. The sensor signals both from the surroundings sensor and from the collision sensor are processed in the regulating and control unit. One or multiple driving condition variables or surroundings variables are possibly also present in the regulating and control unit, in particular the vehicle speed and/or the relative speed between the vehicle and a preceding collision object. Actuating signals for triggering at least one airbag in the vehicle may be generated in the regulating and control unit.

Moreover, the present invention relates to an airbag system in a vehicle including an aforementioned regulating and control unit, and including at least one collision sensor for ascertaining a collision of the vehicle and including at least one surroundings sensor for monitoring the vehicle surroundings for an imminent collision. The airbag system preferably includes an airbag integrated into the steering wheel of the vehicle, further airbags in the vehicle possibly being included in the airbag system, for example side airbags.

Further advantages and advantageous embodiments are described herein and are shown in the figures.

BRIEF DESCRIPTION OF THE DRAWINGS

FIG. 2 shows a flow chart including method steps for checking the functionality of a surroundings sensor as a component of an airbag system in the vehicle.

DETAILED DESCRIPTION OF EXAMPLE EMBODIMENTS

Figure 1:
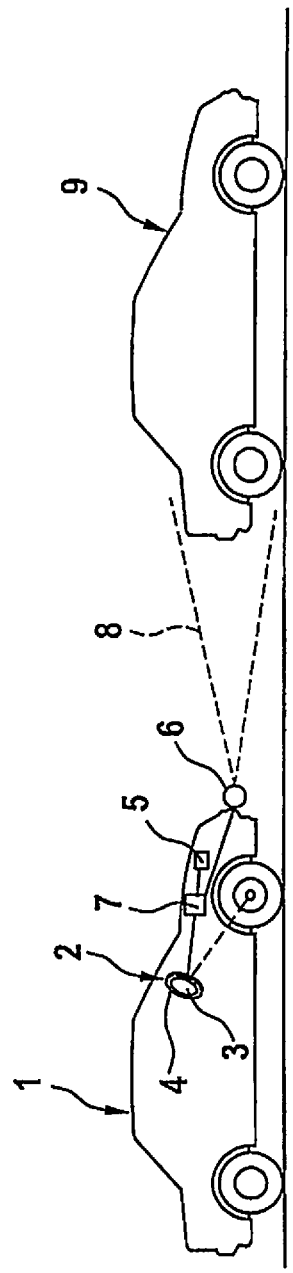
FIG. 1 shows a schematic representation of a vehicle including an airbag system, the vehicle approaching a preceding vehicle.

FIG. 1 shows a vehicle 1 driving on a road, which is equipped with an airbag system 2 which triggers an airbag 3 in the case of a collision of vehicle 1 with a collision object. Airbag system 2 includes, in addition to airbag 3 which is integrated into steering wheel 4 in the vehicle, a collision sensor 5 as well as a surroundings sensor 6 and a regulating and control unit 7, in which the sensor signals from sensors 5 and 6 are processed and in which actuating signals for the triggering of airbag 3 are possibly generated.

In addition to airbag 3 integrated into steering wheel 4, further airbags may also be present in the vehicle, which are part of the airbag system, for example side airbags which are triggered in the case of a collision in a way corresponding to that of airbag 3.

Collision sensor 5 is designed, by way of example, as an acceleration sensor which measures accelerations and decelerations of vehicle 1. If the deceleration of vehicle 1 exceeds a defined limiting value, a collision of vehicle 1 with a collision object must be assumed, whereupon actuating signals for the triggering of airbag 3 are generated in control unit 7.

In order to ascertain a triggering event for the triggering of airbag 3, not only are the signals from acceleration sensor 5 taken into consideration, but, advantageously, so are signals from a surroundings sensor 6, with the aid of which the vehicle surroundings located ahead of vehicle 1 may be monitored. Surroundings sensor 6 is located in the vehicle front area, for example in the front bumper of the vehicle, and is designed, by way of example, as a camera or as a radar system, with the aid of which area 8 located ahead of vehicle 1 may be detected.

In the exemplary embodiment, a preceding vehicle 9 is located ahead of vehicle 1, specifically within detection range 8 of surroundings sensor 6. Preceding vehicle 9 may possibly form a collision object, for example for the case that vehicle 1 inadvertently approaches preceding vehicle 9, which is at a standstill, without sufficient deceleration. With the aid of surroundings sensor 6, it is possible to establish an imminent collision of vehicle 1 with collision object 9 even before the actual onset of the collision. This makes it possible to carry out preparatory measures for the triggering of airbag 3 and to shorten the period of time between the establishment of a collision sensor signal in acceleration sensor 5 and the actual triggering of airbag 3.

FIG. 2 shows a flow chart including method steps for ascertaining a triggering event for the airbag. In a first method step 10, the surroundings sensor signals and the collision sensor signals are continuously taken into consideration as input signals. In step 10, the potential period of time between the surroundings sensor signal, with the aid of which an imminent collision may be established, and the collision sensor signal up to the actual onset of the collision may be ascertained.

In next step 11, a query takes place as to whether a collision has actually occurred within a defined time window, which is carried out on the basis of an evaluation of the collision sensor signals. If this is the case, the "Yes" branch ("Y") is subsequently returned back to step 10 and actuating signals for the triggering of the airbag are generated.

If the query in step 11 yields, however, that a collision has not taken place within a defined time window, where the time window may be ascertained in step 10 and, in particular, may depend on driving condition and surroundings variables, for example the vehicle speed and the relative speed between the vehicle and the collision object, the "No" branch ("N") is subsequently advanced to next step 12.

In step 12, an error signal which represents a false surroundings sensor signal is generated and stored. If multiple such error signals have already been generated, the error signal is added thereto. In subsequent step 13, the query therefore takes place as to whether the present number of error signals exceeds an assigned limiting value. If this is not the case, it is assumed that the surroundings sensor is still functioning properly, and the "No" branch is subsequently returned back to step 10 and the continuous monitoring is continued with the aid of the surroundings sensor and the collision sensor.

If the query in step 13 yields, however, that the limiting value for the number of error signals has been exceeded, the "Yes" branch is subsequently advanced to step 14 and it is established in step 14 that the signals from the surroundings sensor will not be taken into consideration during the ascertainment of the triggering event for the airbag. In this case, a malfunction of the surroundings sensor, at least with respect to the ascertainment of an imminent collision, must be assumed, and therefore the signals from the surroundings sensor are not sufficiently reliable for the ascertainment of the triggering event for the airbag. The triggering event for the airbag is therefore determined solely on the basis of the collision sensor signals.

What is claimed is:

1. A method for ascertaining a triggering event for an airbag in a vehicle, in which a collision of the vehicle is established with a collision sensor, the method comprising:
   measuring, via the collision sensor, accelerations and decelerations of the vehicle;
   monitoring surroundings of the vehicle for an imminent collision with signals from a surroundings sensor;
   ascertaining a defined time window between the signals from the surroundings sensor signal, by which the imminent collision may be established, and collision sensor signal up to an actual onset of the collision;
   ascertaining, based on an evaluation of the collision sensor signal, whether the collision has occurred within the defined time window; and
   generating an error signal each time the imminent collision is ascertained via the surroundings sensor and the collision sensor signal is not established in the collision sensor within the defined time window, wherein the signals from the surroundings sensor are not considered when a defined number of the error signals has been reached.

2. The method as recited in claim 1, wherein the surroundings sensor is utilized again for the collision monitoring after a restart of the vehicle.

3. The method as recited in claim 1, wherein the surroundings sensor is utilized again for the collision monitoring after a defined time interval has elapsed.

4. The method as recited in claim 1, wherein the time window is changeably set as a function of at least one of a driving condition variable and a surroundings variable.

5. The method as recited in claim 1, wherein the time window is set as a fixed, unchanging variable.

6. The method as recited in claim 1, wherein an acceleration sensor for ascertaining the vehicle acceleration is utilized as the collision sensor.

7. The method as recited in claim 1, wherein a camera or a radar system is utilized as the surroundings sensor.

8. A regulating and control apparatus for ascertaining a triggering event for an airbag in a vehicle, in which a collision of the vehicle is established with the aid of a collision sensor, comprising:
   a regulating and control unit configured to perform the following:
      measuring, via the collision sensor, accelerations and decelerations of the vehicle;
      monitoring surroundings of the vehicle for an imminent collision with signals from a surroundings sensor;
      ascertaining a defined time window between the signals from the surroundings sensor signal, by which the imminent collision may be established, and a collision sensor signal up to an actual onset of the collision;
      ascertaining, based on an evaluation of the collision sensor signal, whether the collision has occurred within the defined time window; and
      generating an error signal each time the imminent collision is ascertained via the surroundings sensor and the collision sensor signal is not established in the collision sensor within the defined time window,
      wherein the signals from the surroundings sensor are not considered when a defined number of the error signals has been reached.

9. An airbag system in a vehicle, comprising:
   a collision sensor to measure accelerations and decelerations of the vehicle;
   a surroundings sensor for monitoring the vehicle surroundings for an imminent collision; and
   a regulating and control unit for ascertaining a triggering event for an airbag in a vehicle, in which a collision of the vehicle is established with the collision sensor, wherein the regulating and control unit is configured to monitor surroundings of the vehicle for the imminent collision with signals from the surroundings sensor, to ascertain a defined time window between the signals from the surroundings sensor signal, by which the imminent collision may be established, and a collision sensor signal up to an actual onset of the collision, to ascertain, based on an evaluation of the collision sensor signal, whether the collision has occurred within the defined time window, and to generate an error signal each time the imminent collision is ascertained via the surroundings sensor and the collision sensor signal is not established in the collision sensor within a defined time window;
   wherein the signals from the surroundings sensor are not considered when a defined number of the error signals has been reached.

\* \* \* \* \*